United States Patent [19]
Jondrow et al.

[11] Patent Number: 5,673,068
[45] Date of Patent: Sep. 30, 1997

[54] END-OF-TRAVEL DETECTION SENSOR AND METHOD OF CALIBRATING CONFINED POINTING DEVICE

[75] Inventors: Timothy J. Jondrow; Mark A. Smith, both of Corvallis, Oreg.

[73] Assignee: Hewlett-Packard Company, Palo Alto, Calif.

[21] Appl. No.: 482,157

[22] Filed: Jun. 7, 1995

[51] Int. Cl.⁶ .................................................. G09G 5/08
[52] U.S. Cl. ................................. 345/163; 345/157
[58] Field of Search ................................ 73/490; 341/26; 340/870.04; 345/159, 160, 161, 178, 163, 168, 156, 157; G09G 5/08

[56] References Cited

U.S. PATENT DOCUMENTS

| | | | |
|---|---|---|---|
| 5,012,230 | 4/1991 | Yasuda | 340/706 |
| 5,414,420 | 5/1995 | Puckette et al. | 341/20 |
| 5,428,355 | 6/1995 | Jondrow et al. | 341/20 |
| 5,504,502 | 4/1996 | Arita et al. | 345/160 |
| 5,536,911 | 7/1996 | Madill | 200/6 A |
| 5,555,004 | 9/1996 | Ono et al. | 345/161 |

*Primary Examiner*—Andrew Faile
*Assistant Examiner*—Ngoc-Yen Vu

[57] ABSTRACT

An end-of-travel sensor detects that an object has reached the end of its travel path by sensing a change in vectored force at a single pivot point of the object. The object is linked to and positioned away from the pivot point allowing the object to move within a travel area. During movement within the travel area, little force occurs at the pivot point. As the object reaches an end of travel, however, the object's inertia causes a force to occur at the pivot point. Detection of such force indicates an end-of-travel event. Detection of such force's direction indicates an end-of-travel direction. A elastomeric conductor is mounted about the pivot point within an opening. The conductor and edge contacts at the opening serve as switches. An end-of-travel force acting upon the pivot point closes one or more switches indicating an end-of-travel event. Detection of the affected switch(es) indicates an end-of-travel direction. Such event and direction are used to calibrate an on-screen cursor position to an absolute pointing device position.

17 Claims, 5 Drawing Sheets

END-OF-TRAVEL DETECTION SENSOR AND METHOD OF CALIBRATING CONFINED POINTING DEVICE

CROSS REFERENCE TO RELATED APPLICATIONS

This invention is related to U.S. Pat. No. 5,414,420 issued May 9, 1995, Ser. No. 07/919,483 filed Jul. 24, 1992 for SWITCH INTERCONNECT FOR POSITION ENCODER SYSTEM and U.S. Pat. No. 5,428,355 issued Jun. 27, 1995, Ser. No. 07/856,436 filed Mar. 23, 1992 for POSITION ENCODER SYSTEM. The content of those applications are incorporated herein by reference and made a part hereof.

BACKGROUND OF THE INVENTION

This invention relates to peripheral pointing devices and end travel detection and more particularly to end travel detection of a confined pointing device. End travel information serves to calibrate an end-of-travel position of the pointing device to a corresponding cursor position on a display.

A pointing device controls a displayed cursor for actions such as directional movement and command entry (e.g., "button" pressing in dialog boxes, menu item selection, word/cell selection). Exemplary pointing devices are a mouse, graphics tablet, stylus, light pen, joystick, puck, and trackball. U.S. Pat. Nos. 5,414,420 and 5,428,355 disclose mouse-like pointing devices with an alternative position encoding system. The pointing devices described therein include a small handle that is manipulated by the user to control, for example, cursor position. The handle includes two push-button type switches that can be depressed to activate any number of functions.

The handle is carried on the end of a somewhat rigid elongated link. The link is connected to a carrier that is inside a computer case. The link slides in the carrier, and the carrier rotates, allowing motion of the link in two dimensions. The link's sliding motion and the carrier's rotation are measured to provide data to track the handle's position. The rigid link confines the motion of the handle to a specific area fixed relative to the computer. Accordingly, such a pointing device is referred to herein as a "confined pointing device" and the area as a "confined movement area".

A problem with a confined pointing device is how to calibrate or "map" an absolute position of the pointing device within the confined movement area to a cursor location on a display screen. Typically, the computer does not know where the pointing device is at all times. For example, if the pointing device is moved while the computer is off, the cursor will remain at the same location on the screen as the last time the computer was on. One method for calibrating the confined pointing device as described in the detailed embodiments section below is to use end travel information. By knowing an absolute end-of-travel point, one can calibrate the on-screen cursor to such point. A shortcoming of the link and handle device discussed above is the lack of end travel information. Accordingly, there is a need to detect the end travel of a confined pointing device within a confined movement area.

One solution for detecting end of travel is to add optical sensors having a line of sight with an end of travel indicator. Optical sensors require additional circuit logic, power and physical space in the computer case. Accordingly, a less intrusive, yet effective, alternative solution is desired.

SUMMARY OF THE INVENTION

According to the invention, an end-of-travel sensor detects that an object has reached the end of its travel path by sensing a change in vectored force at a single pivot point of the object. The object is linked to and positioned away from the pivot point allowing the object to move within a travel area. During movement within the travel area, little force occurs at the pivot point. As the object reaches an end of travel, however, the object's inertia causes a force to occur at the pivot point. Detection of such force indicates an end-of-travel event. Detection of such force's direction indicates an end-of-travel direction.

According to one aspect of the invention, the pivot point is generally fixed within an opening. The opening includes edge contacts. Among the contacts are common contacts and directional contacts. In one embodiment there are four directional contacts. An elastomeric conductor is mounted about the pivot point within the opening. The conductor and edge contacts serve as switches. The conductor maintains electrical communication with the common contacts. According to one embodiment, the conductor is normally spaced from the directional contacts. Thus, the defined switches are normally open. When a force is applied to the pivot point in response to end-of-travel inertia, the pivot point is deflected. The surrounding conductor in turn is deflected or deformed into physical and electrical communication with a directional contact. As a result, a switch at one of the directional contacts closes indicating an end-of-travel event and a given end-of-travel direction.

According to another embodiment, the conductor is normally in physical and electrical communication with both the common contacts and directional contacts. The conductor, however, defines a variable resistive element with each directional contact. When a force is applied to the pivot point in response to end-of-travel inertia, the pivot point deflects causing the conductor to deform. The deformation alters the resistance of one or more of the defined variable resistive elements. Detection of such a change in resistance signifies an end-of-travel event. Detection of the directional contact(s) coupled to the affected resistive elements signifies an end-of-travel direction.

According to one application of the invention, the sensor is mounted about a generally fixed pivot point for a confined pointing device. A confined pointing device as used herein means a pointing device having a handle away from yet mechanically linked to the pivot point, the handle being movable within a confined movement area. "Generally fixed pivot point" as used herein means a pivot point which does not move noticeably during normal operation, but which may be offset, deflected or deformed in the presence of an end-of-travel force. In connection with a confined pointing device, "generally fixed pivot point" means the pivot point does not move significantly during normal manipulation of the pointing device handle, but which may be offset, deflected or deformed in the presence of an end-of-travel force. For example, at the end of travel of the pointing device, the force on the pivot point will increase in a radial direction from the pivot point toward the end-of-travel point. Detection of a direction component of the force vector gives an absolute end-of-travel position along the periphery of the confined movement area. Such position is used to map an on-screen cursor to a corresponding display screen position.

One advantage of the invention is that end of travel can be detected in all directions about a single point by a single component. A beneficial effect of the low part count added about a pivot point is the modest cost incurred to provide end-of-travel information. These and other aspects and advantages of the invention will be better understood by reference to the following detailed description taken in conjunction with the accompanying drawings.

DESCRIPTION OF SPECIFIC EMBODIMENTS

Confined Pointing Device

Figure 1:
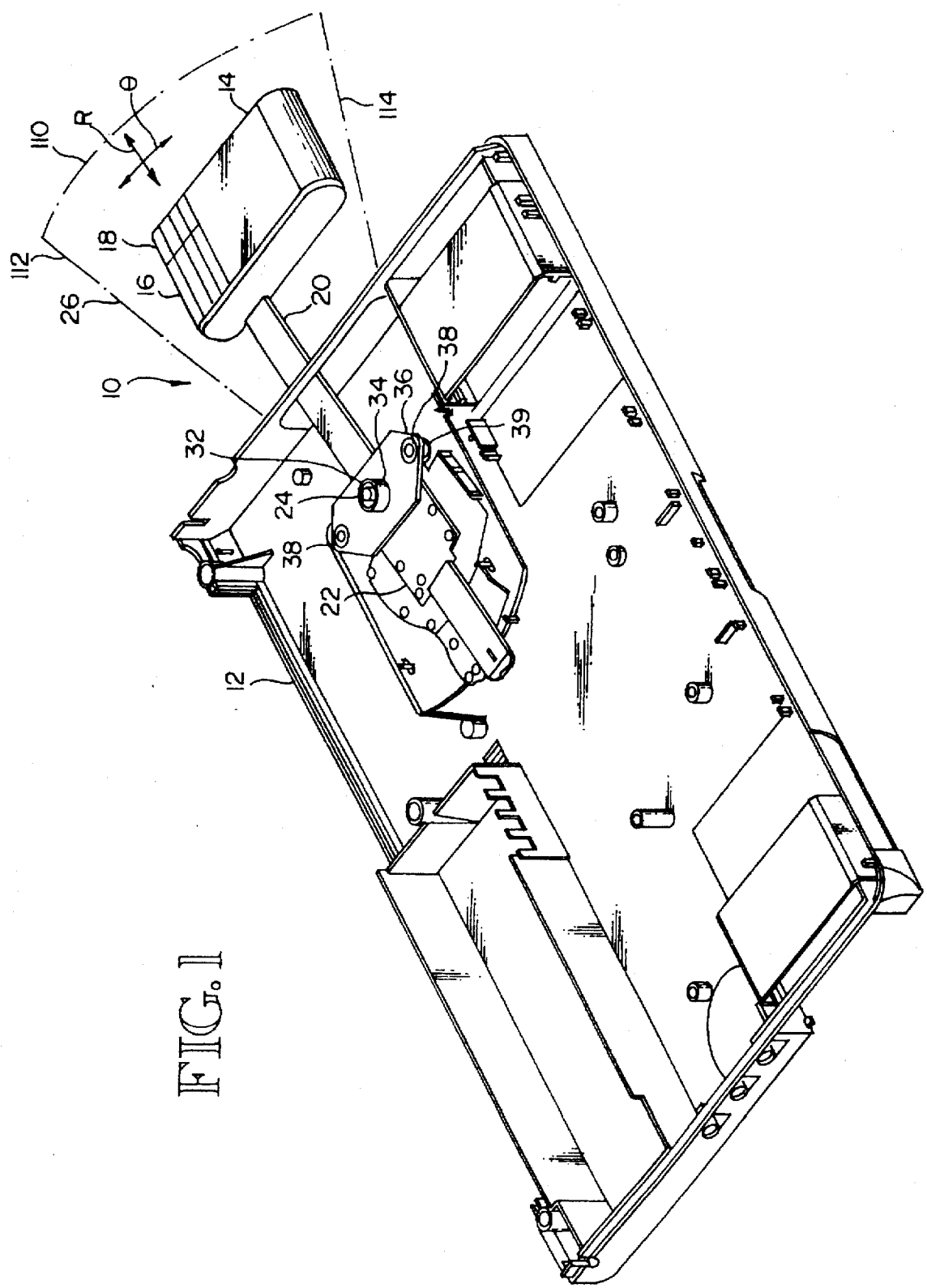
FIG. 1 is a perspective view of a confined pointing device assembly coupled to a computer case.

FIG. 1 shows an embodiment of confined pointing device 10 mounted in a mobile-computer case 12. The pointing device 10 is used for controlling a cursor position and, in general, pointing to objects (e.g., symbols, graphics, words and areas) viewed on a computer's display. In the illustrated embodiment the confined pointing device 10 includes a small handle 14 that is manipulated by the computer user. The handle 14 includes two push-button type switches 16, 18 that can be depressed to activate any number of functions.

The handle 14 is carried on the end of a generally rigid elongated link 20. The link 20 is connected to a carrier 22 that is inside the computer case 12. The link 20 slides in the carrier 22, and the carrier rotates about a pivot point 24, allowing motion of the link 20 in two dimensions. Sliding motion along the axis of the link 20 is a radial motion R. Rotational motion about the pivot point 24 is angular motion θ. The link's sliding motion R and the carrier's rotation motion θ are measured to provide data to track the handle's position. The rigid link 20 confines the motion of the handle 14 to a specific area 26 fixed relative to the computer case 12. Such area is referred to herein as a "confined movement area."

The pivot point 24 is defined by a pivot rod 32 attached to the carrier 22. A pivot bushing 34 surrounds the rod 32. A pivot bracket 36 is mounted to the computer case 14 via posts 38. Elastomeric grommets 39 surround the posts 38. The pivot bracket centers the pivot rod 32 and bushing 34 so as to maintain the pivot point 24 generally fixed relative to the computer case 14.

Further description of the illustrated pointing device 10 embodiment is found in commonly-assigned U.S. patent applications, (i) Ser. No. 07/919,483 filed Jul. 24, 1992 for SWITCH INTERCONNECT FOR POSITION ENCODER SYSTEM, and (ii) Ser. No. 07/856,436 filed Mar. 23, 1992 for POSITION ENCODER SYSTEM, both of which are incorporated herein by reference.

The pointing device 10 of FIG. 1 is modified according to an embodiment of this invention to include an elastomeric conductor and define an end-of-travel sensor.

End-of-Travel Sensor

Figure 2:
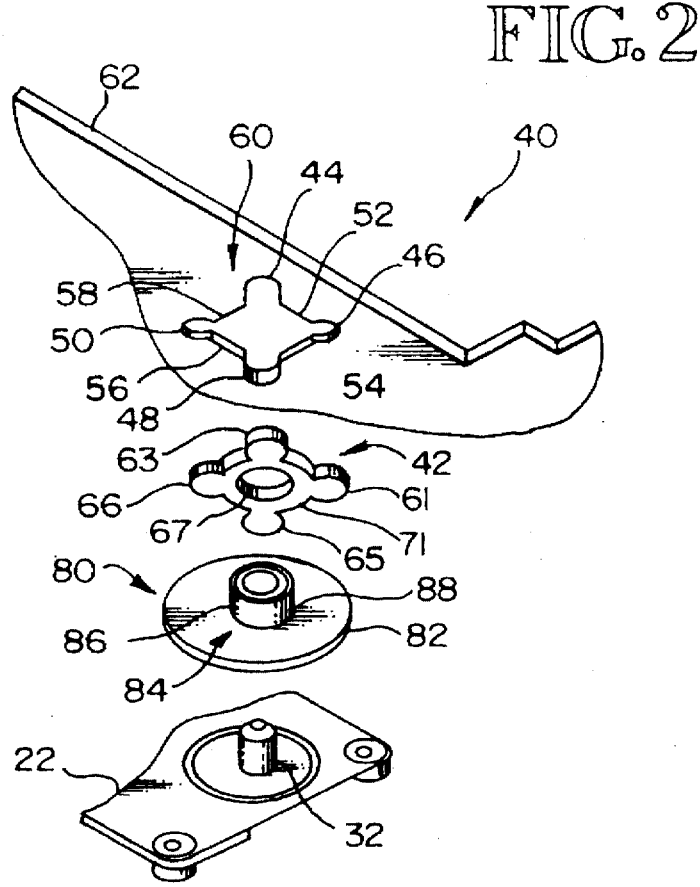
FIG. 2 is an exploded view of an end-of-travel sensor according to one embodiment of this invention.

FIG. 2 shows the end-of-travel sensor 40 according to one embodiment of this invention. The sensor 40 is formed by an elastomeric conductor 42 and conductive edge contacts 44–58. In a specific embodiment the elastomeric conductor 42 is formed by a styrenic thermoplastic elastomer rated at 40 durometer shore A and is 40% carbon loaded. Exemplary material has a resistance of 100–1000 ohms/square area and is available as part no. RTP 2799X66963 from RTP Company of Winona, Minn. The specific shape, material and conductivity of the conductor 42 may vary. In a specific embodiment the conductor generally forms a grommet-like ring with four ear-like portions 63, 64, 65, 66 protruding outward from the ring. An inner surface of the ring defines a cylinder 67.

The conductive edge contacts 44–58 are formed at an opening 60 within a printed circuit board 62. Common contacts 44, 46, 48, 50 are located along respective arcs of the opening 60. Each common contact 44–50 remains in physical and electrical communication with the conductor 42 during operation. The respective ear-like portions 63–66 of conductor 42 mate to the common contacts 44–50.

Figure 3:
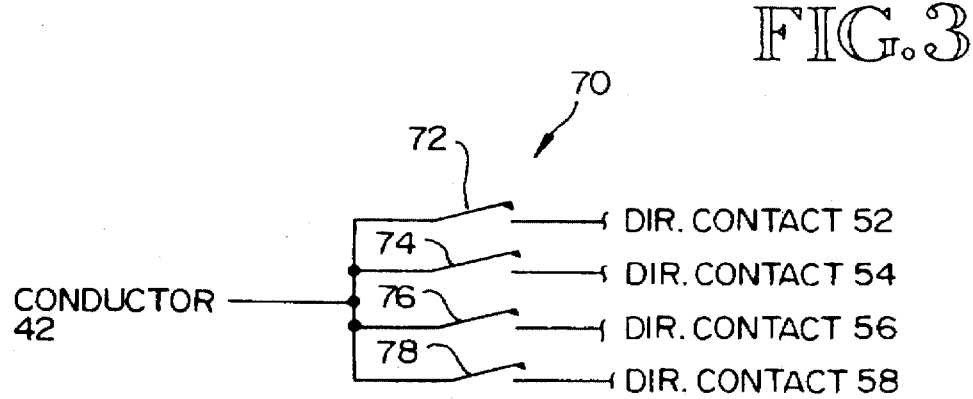
FIG. 3 is an electrical schematic of the end-of-travel sensor of FIG. 2.

Directional contacts 52, 54, 56, 58 are located between the respective arcs of the common contacts 44–50. The common contacts 44–50 and directional contacts 52–58 are located along edges of the pc board 62. Such edges define the opening 60. In one embodiment, upon assembly each directional contact 52–58 is spaced apart from the conductor 42 by approximately 0.01 inches. In the presence of an end-of-travel force the conductor 42 is offset, deflected or deformed to cause outer surface 71 of conductor 42 to come into physical and electrical communication with one or more directional contacts 52–58. The outer surface 71 occurs between the four ear-like protrusions 63–66. Referring to FIG. 3, the elastomeric conductor 42 and edge conductors 44–58 form an electrical circuit 70 of four normally-open switches 72, 74, 76, 78.

Figure 4:
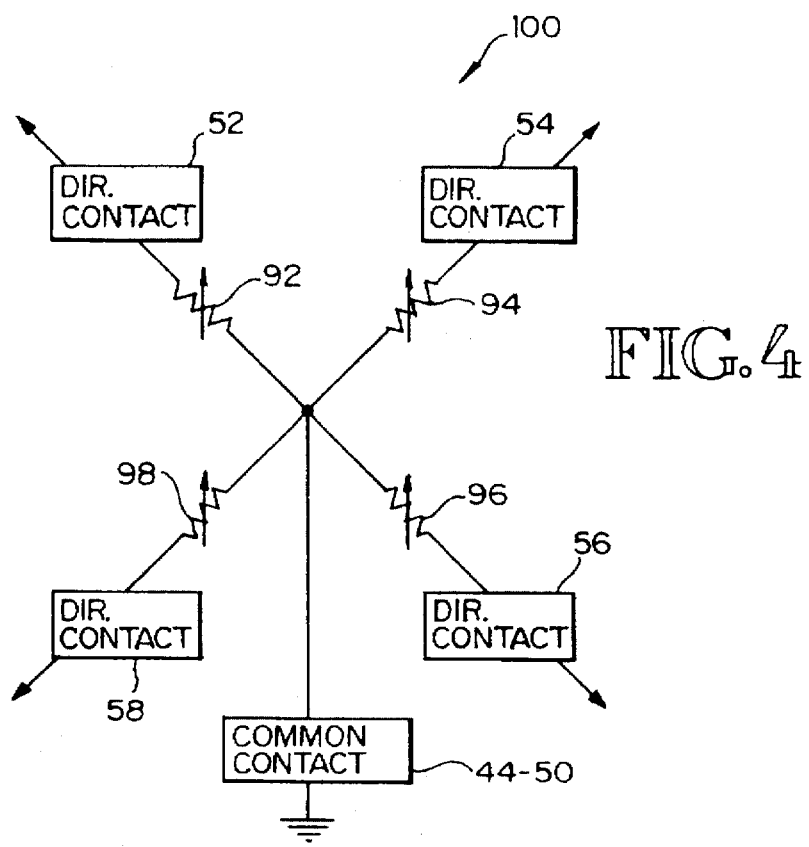
FIG. 4 is an electrical schematic of an alternative embodiment of the travel sensor of FIG. 2.

According to an alternative embodiment the elastomeric conductor 42 is continually in physical and electrical communication with the common contacts 44–50 and directional contacts 52–58. Referring to FIG. 4, the elastomeric conductor 42 defines four variable resistors 92, 94, 96, 98. The resistors 92–98, common contacts 42–50 and directional contacts 52–58 define an electrical circuit 100. In the presence of an end-of-travel force the conductor 42 is deformed to vary the resistances of one or more of the resistors 92–98. Detection of a change in resistance signifies an end-of-travel force. The change in resistance of a specific one or more resistors 92–98 indicates a specific direction of the end-of-travel force.

Referring again to FIG. 2 also shown is the carrier 22 with pivot rod 32. A modified pivot bushing 80 is received onto the pivot rod 32. In one embodiment the pivot bushing 80 is a plastic non-conductive bushing which concentrically surrounds pivot rod 32. The bushing 80 includes a circular base portion 82 and a cylindrical post portion 84. An external surface 86, 88 of the post portion 84 is of a shape which mates with the internal ring surface 67 of the elastomeric conductor 42. The external surface 86 of the post portion 84 defines a lip.

Method for Detecting End of Travel

During normal radial movement of the link 20 and normal rotational movement of the carrier 22, there is little force acting upon the pivot rod 32. According to one preferred embodiment, any such deflecting force is not enough to close one of the switches 72–78 (see FIG. 3). In another alternative embodiment, such deflecting force, if any, is not enough to cause a sufficient change in resistance of any of resistors 92–98 (see FIG. 4). Thus, the circuit 70/100 does not register an end-of-travel force.

Figure 5:
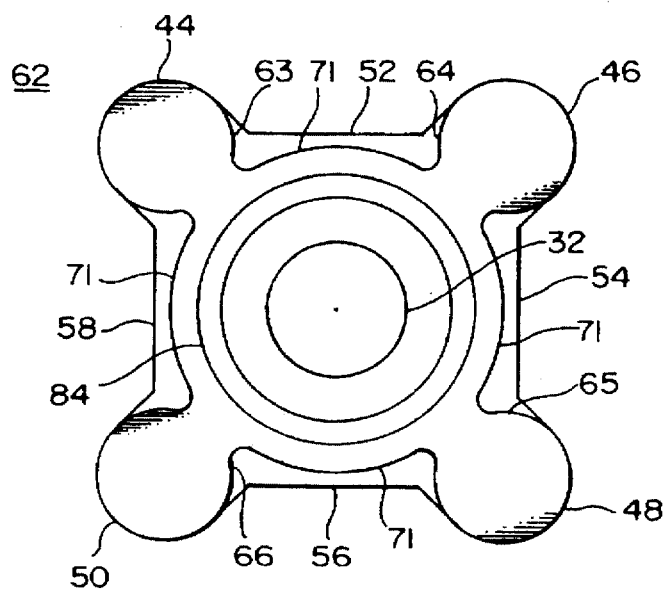
FIG. 5 is a planar view of the pivot post, pivot bushing, elastomeric conductor and pc board opening of FIG. 2 in the absence of an end-of-travel force.
Figure 6:
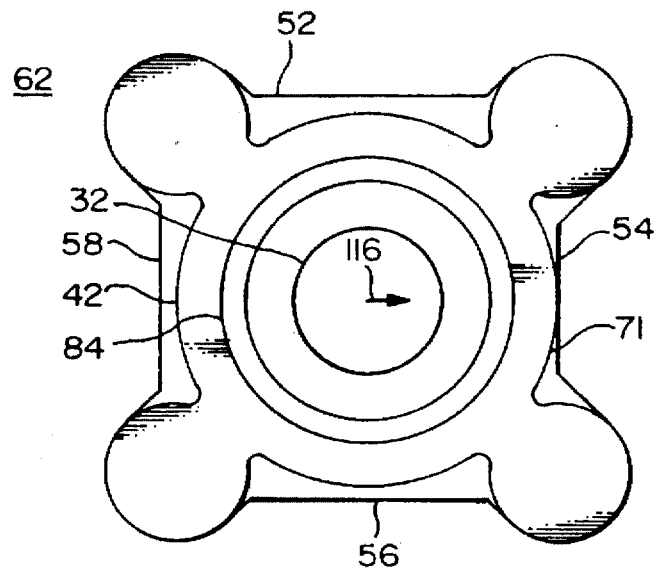
FIG. 6 is a planar view of the pivot post, pivot bushing, elastomeric conductor and pc board opening of FIG. 2 in the presence of an end-of-travel force.
Figure 7:
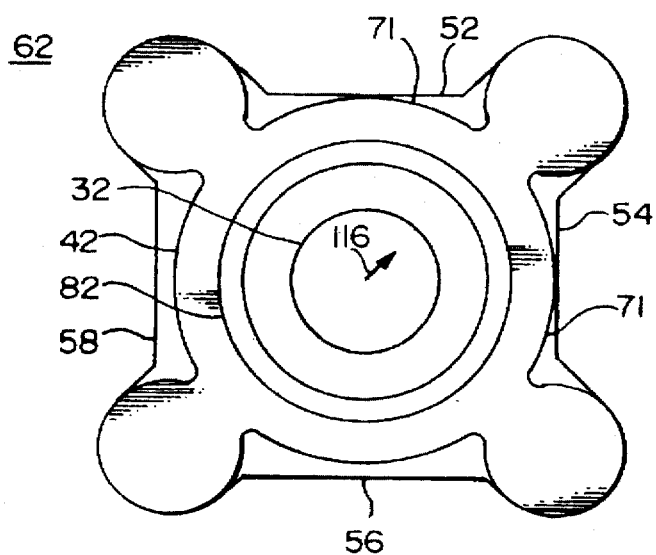
FIG. 7 is a planar view of the pivot post, pivot bushing, elastomeric conductor and pc board opening of FIG. 2 in the presence of another end-of-travel force.

FIG. 5 shows a planar view of the pivot post 32, pivot bushing post 84, elastomeric conductor 42 and pc board 62 for the condition in which a deflecting force does not act upon the pivot post 32. This corresponds to the normal manipulation of the handle 14 to move the link 20 in the R direction and the carrier 22 over an angular direction θ (See FIG. 1). Referring to FIGS. 1 and 6, when a computer user moves the handle 14 to a boundary 110 of the confined movement area 26, the link 20 reaches an end stop (not shown) within the computer case 14. The inertia of such motion manifests an end-of-travel force 116 upon the pivot rod 32. The end-of-travel force 116 deflects or slightly offsets the pivot rod 32 and pivot bushing post 84 within opening 60. As the opening 60 is defined by rigid walls, the end-of-travel force offsets, deflects or deforms the elastomeric conductor 42 in a direction corresponding to the force 116. As a result a surface 71 of the conductor 42 is moved into physical and electrical communication with directional contact 54 closing switch 74. Similarly movement of the handle to a boundary 112 or 114 causes the carrier 22 to reach a rotational stop (not shown) within the computer case 14. The inertia of the motion creates an end-of-travel force resisted at the pivot post 32. As a result the pivot post 32 is deflected slightly transmitting the end-of-travel force into the pivot bushing 80 and elastomeric conductor 42. The conductor deforms under the force with conductor surface 71 temporarily moving into contact with directional contact 56 or 52 closing switch 76 or 72, respectively.

Movement of the handle in the vicinity of a corner of the confined movement area 26 causes the end-of-travel 116 force to move the conductor surface 71 into contact with two directional contacts, respectively. Specifically, inertial forces caused when moving the handle 14 to the boundaries 110 and 112 in the vicinity of the boundary 110, 112 juncture deform the conductor 42 into physical and electrical communication with directional contacts 54 and 56. Thus, switches 74 and 76 close. Inertial forces caused when moving the handle 14 to the boundaries 110 and 114 in the vicinity of the boundary 110, 114 juncture deform the conductor 42 into physical and electrical communication with directional contacts 54 and 52. Thus, switches 74 and 72 close.

In the alternative embodiment represented by FIG. 4, the end-of-travel force increases the resistance of one or more resistors 92–98. For example, increasing resistance of resistor 92 corresponds with closing of switch 72. Increasing resistance of resistor 94 corresponds with closing of switch 74. Increasing resistance of resistor 96 corresponds with closing of switch 76. Increasing resistance of resistor 98 corresponds with closing of switch 78.

By periodically or aperiodically sampling the switches 72–78, an end-of-travel event and direction is identified. Closing of any switch 72–78 signifies that the handle 14 has reached the end of its travel path. Identification of the specific switch or switches that close determines the direction of the end-of-travel force. With four directional contacts, any of four end-of-travel directions are identified. Further, by detecting two switches to be closed any of four end-of-travel corners are identified.

In the alternative embodiment of FIG. 5, by periodically or aperiodically sampling the signal across resistors 92–98, an end-of-travel event and direction is identified. Increasing the resistance beyond a prescribed value of any resistor 92–98 signifies that the handle 14 has reached the end of its travel path. Identification of the specific resistor or resistors with such an increased resistance determines the direction of the end of travel. With four directional contacts, any of four end-of-travel directions are identified. Further, by detecting two resistors as having increased resistance any of four end-of-travel corners are identified.

In other embodiments an end-of-travel event occurring at circuit 70 or 100 triggers an interrupt for a processor to register the event and end-of-travel direction(s).

Method for Calibrating Pointing Device

In one application, detection of an end-of-travel event and direction is used for calibrating an on-screen cursor to an absolute pointing device position. For the pointing device 10 of FIG. 1, handle 14 initially is at a first position $p_1$ within the confined movement area 26. The cursor C on a display screen 130 is at a corresponding first position $p_1'$. To calibrate the cursor C to the absolute position of handle 14, the handle is moved to an end-of-travel position so as to create an end-of-travel force on pivot post 32. For example, handle 14 is moved in a direction 132. Similarly, the cursor moves in the same direction 132' on display 130. Just before the handle 14 reaches the end of its travel path, it is at a second position $p_2$. The cursor C is at a corresponding second position $p_2'$. When the handle 14 moves to a third position $p_3$ at the boundary 110, an end stop prevents further motion. Due to the user motion's inertia, the user's hand exerts a force on the handle which causes a corresponding end-of-travel force to occur at the pivot rod 32. The pivot rod 32 deflects causing the elastomeric conductor 42 to deform and in turn cause electrical circuit 70 or 100 to indicate an end-of-travel event. Sampling the circuit 70 or 100 provides end-of-travel direction information. If boundary 110 is reached, then the handle 14 has reached an end of travel corresponding to the boundary 136 of display 130. If boundary 112 is reached, then the handle 14 has reached an end of travel corresponding to the boundary 134 of display 130. If boundary 114 is reached, then the handle 14 has reached an end of travel corresponding to boundary 138 of display 130. In some embodiments a boundary 115 also is present limiting the motion of handle 14. If boundary 115 is reached, then the handle 14 has reached an end of travel corresponding to boundary 140 of display 130.

Figure 8:
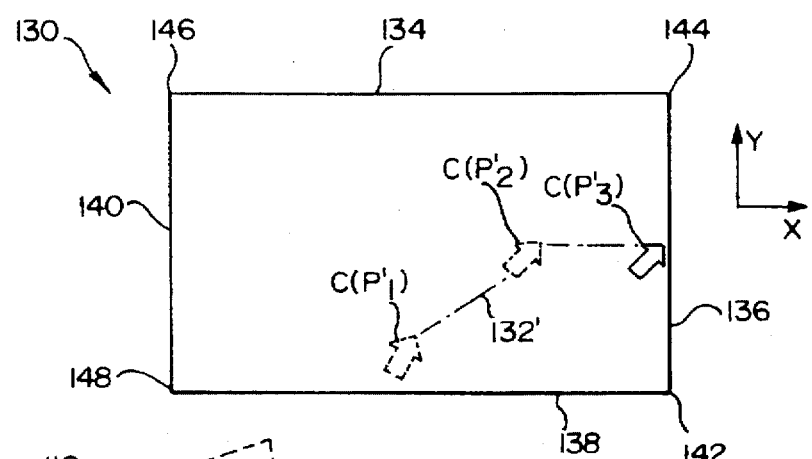
FIG. 8 is a diagram of cursor movement on a display tracking pointing device movement according to an embodiment of the method of this invention.
Figure 8:
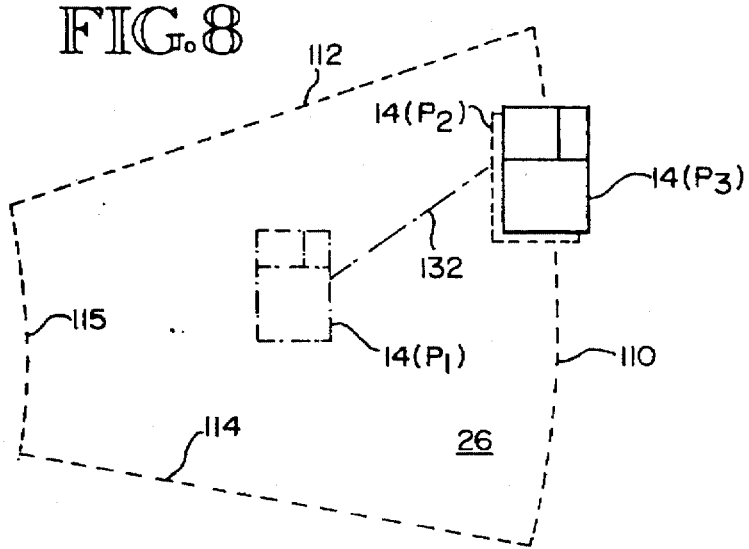

According to one embodiment, the cursor C is calibrated to the handle's 14 end-of-travel position by moving the cursor from a current position orthogonally to a select screen boundary. The select screen boundary is the screen boundary corresponding to the area 26 boundary reached by the handle 14. In the sample motion shown in FIG. 8, the handle is moved in direction 132 to boundary 110 of area 26. Just before the handle 14 reached the boundary 110, the cursor was at position $p_2'$. When boundary 110 is reached, the end-of-travel force closes switch 74. The end-of-travel event causes cursor control software to re-position the cursor. The cursor is moved to the screen boundary 136 corresponding to the encountered boundary 110 and closed switch 74. The cursor is moved from position $p_2'$ to its calibrated position $p_3'$ by moving it orthogonally to the boundary 136. Specifically, the cursor is moved along the x axis. If boundary 112 is encountered, and thus switch 72 closed, the cursor C moves from its most prior position orthogonally along the y axis to screen boundary 134. If boundary 114 is encountered, and thus switch 76 closed, the cursor C moves from its most prior position orthogonally along the y axis to screen boundary 138. If boundary 115 is encountered, and thus switch 78 closed, the cursor C moves from its most prior position orthogonally along the x axis to screen boundary 140.

If two switches 72–78 are closed, then the cursor is moved to a corner of the screen 130. Thus, if handle 14 is moved toward boundaries 110 and 112 closing switches 74, 72, then the cursor is moved to corner 142. If handle 14 is moved toward boundaries 110 and 114 closing switches 74, 76, then the cursor is moved to corner 144. If handle 14 is moved toward boundaries 115 and 112 closing switches 78, 72, then the cursor is moved to corner 148. If handle 14 is moved toward boundaries 115 and 114 closing switches 78, 76, then the cursor is moved to corner 146.

Calibrating the cursor C position to an absolute position is desirable for confined pointing devices. Whenever a confined pointing device is active and moved, the cursor also moves in a corresponding direction. Because the device may be moved by a user before it becomes active, (e.g., when computer is off), however, the entire display screen does not always map to the device movement area 26. Specifically, the cursor may be at the left side of the screen, while the device 14 is at near the right edge of the movement area 26. Thus, the cursor would normally be movable only over a small portion at the left side of the screen. Calibrating the cursor to an absolute position of the handle 14 (e.g., a peripheral boundary of area 26) effectively maps the screen to the movement area of pointing device 10.

Meritorious and Advantageous Effects

One advantage of the invention is that end of travel can be detected in all directions about a single point by a single component. A beneficial effect is that the end-of-travel indication and direction are identified using a low part count added about a pivot point. Correspondingly, only modest cost is incurred to provide end-of-travel information. Further, in the illustrated embodiments of the pointing device 10, only simple changes are made to embody the sensor 40. Specifically, the pc board 62 is modified to redefine an opening 62, the pivot bushing is remodeled, an elastomeric conductor 42 is added, and the pivot bracket 36 and stop cushions 39 are eliminated. The pc board is mounted to posts 38 and serves the function of the prior pivot bracket 36.

Although a preferred embodiment of the invention has been illustrated and described, various alternatives, modifications and equivalents may be used. For example, although four directional contacts are described, fewer or more directional contacts may be implemented to decrease or increase the directional precision of the sensor. Also, the specific size, shape and conductivity of the conductor 42 may vary. Further, although a spacing of 0.01 inches between the directional contacts 52–58 and the elastomeric conductor 42 is described for a specific embodiment, the spacing may vary. Different elasticities of different conductor 42 embodiments may have different spacings to respond to a threshold force prescribed to represent an end-of-travel force. Further the conductor 42 material may vary (e.g., silicone conductor). Therefore, the foregoing description should not be taken as limiting the scope of the inventions which are defined by the appended claims.

What is claimed is:

1. A pointing apparatus controlling movement of an on-screen reference for a computer having a computer screen and a housing, comprising:

a handle movable within a confined movement area, the confined movement area defining a plane;

a link member having an outer end connected to the handle and an inner end received in the housing, the inner end and outer end of the link member moving with the handle, the link member moving within the plane defined by the confined movement area relative to a pivot point;

a first signal varying with changes in handle position for use in controlling movement of the on-screen reference;

an elastomeric conductor located about the pivot point, the elastomeric conductor receiving force exerted on the pivot point; and a plurality of directional contacts adjacent to the elastomeric conductor; and wherein in response to the handle moving to a peripheral border of the confined movement area, an end-of-travel force is exerted on the elastomeric conductor via the link member, the force effecting an electrical circuit comprising the elastomeric conductor and at least one of the plurality of directional contacts to indicate that the handle has moved to an end of the handle's travel path, the electrical circuit generating an indication signal for indicating an end-of-travel direction for the handle, the indication signal derived independently from the first signal.

2. The pointing apparatus of claim 1, in which each one of the plurality of directional contacts is indicative of a corresponding end-of-travel direction.

3. The pointing apparatus of claim 1, in which the plurality of directional contacts normally define an open circuit with the conductor, and in which the conductor closes a circuit with at least one of said plurality of directional contacts in the presence of an end-of-travel exerted force.

4. The pointing apparatus of claim 1, in which the end-of-travel direction is determined from a variation in resistance of the elastomeric conductor corresponding to the exerted force and a direction of the exerted force.

5. The pointing apparatus of claim 1, wherein the end-of-travel force only occurs at the peripheral border of the confined movement area.

6. The pointing apparatus of claim 1, further comprising a pivot defining the pivot point, and wherein the elastomeric conductor mates to the pivot, and wherein the end-of-travel force causes the pivot to any one of offset, deform or deflect the elastomeric conductor.

7. A method for controlling movement of an on-screen reference for a computer having a pointing device, a pointing device calibration circuit, a computer screen and a housing, the calibration circuit comprising an elastomeric conductor and directional contacts, the method comprising the steps of:

moving a handle of the pointing device within a confined movement area, the confined movement area defining a plane;

moving with the handle a link member of the pointing device, the link member coupled to the handle and having an end received in the housing, the link member moving relative to a pivot point;

generating with the pointing device a first signal input to the computer for controlling movement of the on-screen reference, the first signal varying in response to movement of the handle within the confined movement area; and calibrating absolute handle position and location of the on-screen reference when the handle moves to a peripheral border of the confined movement area, wherein the step of calibrating comprises the steps:

(a) receiving a force at the elastomeric conductor due to the pointing device handle moving to the peripheral border of the confined movement area, wherein the elastomeric conductor is located about the pivot point and wherein the directional contacts are adjacent to the elastomeric conductor;

(b) generating by the calibration circuit an end-of-travel direction signal defined by the elastomeric conductor and at least one of a plurality of directional contacts; and (c) changing location of the on-screen reference based upon the direction signal to calibrate absolute handle position and on-screen reference location, and wherein the generation of the end-of-travel direction signal is independent of the generation of the first signal.

8. The method of claim 7, in which the plurality of directional contacts normally define an open circuit with the elastomeric conductor, and in which the conductor closes a circuit with at least one of said plurality of directional contacts in the presence of said received force.

9. The method of claim 7, in which the received force varies resistance of the elastomeric conductor causing the calibration circuit to indicate an end-of-travel direction.

10. The method of claim 7 in which the step of changing location of the on-screen reference results in a calibrated on-screen reference location along a peripheral border of a display screen area, the calibrated on-screen reference location being derived from an end-of-travel direction indicated by the end-of-travel-direction signal and a prior on-screen reference location as derived from the first signal.

11. A method for calibrating a pointing device and a display screen cursor, the pointing device moveable relative to a generally fixed pivot point and within a confined movement area, the method comprising the steps of:

exerting a force on the pivot point as the pointing device moves to a peripheral border of the confined movement area, wherein the exerted force causes a corresponding force on an adjacent elastomeric conductor, wherein a current location of the pointing device as moved to the peripheral border corresponds to an absolute position of the pointing device;

sensing an end-of-travel direction of the pointing device from an electrical circuit defined by the elastomeric conductor and at least one of a plurality of directional contacts; and calibrating cursor position on a display screen and pointing device absolute position, wherein the step of calibrating comprises moving the display screen cursor to an on-screen position along a peripheral border of a display area of the display screen, wherein the on-screen position along the peripheral border of the display area is based upon the sensed end-of-travel direction.

12. The method of claim 11, in which the plurality of directional contacts normally define an open circuit with the elastomeric conductor, and in which the conductor closes a circuit with at least one of said plurality of directional contacts in the presence of said corresponding force.

13. The method of claim 11, in which the corresponding force varies resistance of the elastomeric conductor causing the electrical circuit to indicate the end-of-travel direction.

14. The method of claim 11, wherein the on-screen position along the peripheral border of the display area is based upon the sensed end-of-travel direction and a prior position of the on-screen reference.

15. A system for controlling movement of an on-screen reference in a computer having a computer screen and a housing, the system comprising:

a pointing device generating a first signal for controlling movement of the on-screen reference, wherein at least a portion of the pointing device moves relative to the housing about a pivot point, the pointing device having a handle movable within a confined movement area, the confined movement area defining a plane, wherein movement of the handle within the confined movement area causes variations in the first signal; and an electrical circuit used for calibrating the pointing device in response to the pointing device handle moving to a peripheral border of the confined movement area, the circuit comprising an elastomeric conductor located about the pivot point, and a plurality of directional contacts adjacent to the elastomeric conductor, wherein movement of the handle to the peripheral border of the confined movement area causes a force to be exerted on the elastomeric conductor at the pivot point, the elastomeric conductor in turn causing the electrical circuit to generate a calibration signal corresponding to an end-of-travel direction for the handle, wherein the calibration signal is input to the computer to calibrate handle position at the peripheral border to a location on the computer screen derived from the signal, wherein the calibration signal of the electrical circuit is generated independent of the first signal of the pointing device.

16. A method for controlling movement of an on-screen reference in a computer having a computer screen and a housing, the method comprising the steps of:

generating with a pointing device a first signal for controlling movement of the on-screen reference, wherein at least a portion of the pointing device moves relative to the housing about a pivot point, the pointing device having a handle movable within a confined movement area, the confined movement area defining a plane, wherein movement of the handle within the confined movement area causes variations in the first signal; and calibrating the pointing device in response to the pointing device handle moving to a peripheral border of the confined movement area, the step of calibrating comprising the steps:

(a) moving the handle to the peripheral border of the confined movement area;

(b) receiving, in response to the step of moving the handle, a force at an elastomeric conductor located about the pivot point, wherein a plurality of directional contacts are located adjacent to the elastomeric conductor;

(c) generating with an electrical circuit formed by the elastomeric conductor and at least one of the directional contacts a calibration signal corresponding to an end-of-travel direction for the handle; and (d) changing location of the on-screen reference based upon the calibration signal to calibrate absolute handle position and on-screen reference location; and wherein the calibration signal is generated independently of the first signal.

17. The method of claim 16, wherein the step of changing location of the on-screen reference comprises moving the location of the on-screen reference to a location along a peripheral border of a display area of the computer screen, and in which a specific location along the peripheral border of the display area is determined from the end-of-travel direction derived from the calibration signal and a prior on-screen reference position derived from the first signal.

* * * * *